(12) United States Patent
Horaguchi et al.

(10) Patent No.: US 10,118,156 B2
(45) Date of Patent: Nov. 6, 2018

(54) EXHAUST GAS PURIFICATION DEVICE

(71) Applicants: CATALER CORPORATION, Kakegawa-shi, Shizuoka (JP); TOYOTA JIDOSHA KABUSHIKI KAISHA, Toyota-shi, Aichi-ken (JP)

(72) Inventors: Keiji Horaguchi, Kakegawa (JP); Makoto Tsuji, Kakegawa (JP); Hiroto Imai, Kakegawa (JP); Yasuyoshi Sasaki, Kakegawa (JP); Hiroto Yoshida, Kakegawa (JP); Takeshi Nobukawa, Toyota (JP)

(73) Assignees: CATALER CORPORATION, Kakegawa (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/298,922

(22) Filed: Oct. 20, 2016

(65) Prior Publication Data

US 2017/0113206 A1    Apr. 27, 2017

(30) Foreign Application Priority Data

Oct. 27, 2015    (JP) .................................. 2015-211242

(51) Int. Cl.
*B01D 53/94* (2006.01)
*B01J 23/10* (2006.01)
(Continued)

(52) U.S. Cl.
CPC .......... *B01J 23/58* (2013.01); *B01D 53/9422* (2013.01); *B01J 23/10* (2013.01); *B01J 23/63* (2013.01); *B01J 35/04* (2013.01); *B01J 37/0213* (2013.01); *B01J 37/0236* (2013.01); *B01J 37/08* (2013.01); *F01N 3/28* (2013.01); *B01D 2255/1021* (2013.01); *B01D 2255/1023* (2013.01);
(Continued)

(58) Field of Classification Search
None
See application file for complete search history.

(56) References Cited

U.S. PATENT DOCUMENTS

2002/0031452 A1* 3/2002 Okamoto ........... B01D 53/9422
                                                422/168
2012/0088655 A1    4/2012 Yabuzaki et al.

FOREIGN PATENT DOCUMENTS

JP    H09215922 A    8/1997
JP    2002326033 A   11/2002
(Continued)

*Primary Examiner* — Colin W. Slifka
(74) *Attorney, Agent, or Firm* — Oliff PLC (57) ABSTRACT

Exhaust gas purification device having a catalyst layer including an Rh—Ba-loaded catalyst, and a Pt/Pd—Ba-loaded catalyst. The exhaust gas purification device satisfies at least one of (a) the degree of Rh—Ba dispersion is greater than 0.001 and less than 1.000, (b) the loaded amount of Ba based on the weight of a first carrier particle in the Rh—Ba-loaded catalyst is greater than 0.01% by weight and less than 10.00% by weight, and the loaded amount of Ba based on the weight of a second carrier particle in the Pt/Pd—Ba-loaded catalyst is 10.00% by weight to 20.00% by weight, and (c) the loaded amount of Ba based on the weight of the first carrier particle in Rh—Ba-loaded catalyst is greater than 0.005 times to less than 0.800 times the loaded amount of Ba based on the weight of the second carrier particle in Pt/Pd—Ba-loaded catalyst.

9 Claims, 5 Drawing Sheets

(51) Int. Cl.
*B01J 23/58* (2006.01)
*B01J 23/63* (2006.01)
*B01J 35/04* (2006.01)
*B01J 37/02* (2006.01)
*B01J 37/08* (2006.01)
*F01N 3/28* (2006.01)

(52) U.S. Cl.
CPC ........... *B01D 2255/1025* (2013.01); *B01D 2255/2042* (2013.01); *B01D 2255/2092* (2013.01); *B01D 2255/407* (2013.01); *B01D 2255/9022* (2013.01); *B01D 2255/91* (2013.01); *B01D 2257/404* (2013.01)

(56) References Cited

FOREIGN PATENT DOCUMENTS

| | | | |
|---|---|---|---|
| JP | 3997783 | B2 | 10/2007 |
| JP | 5380534 | B2 | 1/2014 |

\* cited by examiner

(a) MEASUREMENT RESULT OF Ba DISTRIBUTION IN CATALYST LAYER

(b) MEASUREMENT RESULT OF Rh DISTRIBUTION IN CATALYST LAYER (c) Ba ON Rh-LOADED CARRIER PARTICLE IN CATALYST LAYER

EXHAUST GAS PURIFICATION DEVICE

TECHNICAL FIELD

The present invention relates to an exhaust gas purification device.

BACKGROUND ART

Exhaust gas restrictions have become increasingly severe in recent years, and among restrictions in place for HC, CO and $NO_x$, steps have been taken to tighten regulations on NO in particular. $NO_x$ storage reduction catalysts, obtained by loading an $NO_x$ storage material such as an alkaline metal, alkaline earth metal or rare earth element on carrier particles along with a precious metal, are being used to improve $NO_x$ storage performance in exhaust gas purification catalysts.

$NO_x$ storage reduction catalysts are known in which an $NO_x$ storage material such as an alkaline metal or alkaline earth metal is loaded on carrier particles together with a platinum group metal such as platinum (Pt), palladium (Pd) or rhodium (Rh). Among these, Pt and Pd mainly contribute to oxidative purification of CO and HC and oxidation of NO to $NO_2$ in lean atmospheres, while Rh mainly contributes to reductive purification of $NO_2$ in rich atmospheres. The alkaline earth metal Ba temporarily stores $NO_2$ formed as a result of oxidation by Pt and Pd in lean atmospheres, and then releases the storage $NO_2$ in stoichiometric to rich atmospheres. The released $NO_2$ is then purified by reacting with a reducing component contained in exhaust gas due to the action of Rh.

With respect thereto, Patent Document 1 discloses an $NO_x$ storage reduction catalyst obtained by loading Pt and Rh on the same carrier particles followed by further loading Ba to have Pt, Rh and Ba present on the same carrier particles.

Patent Documents 2 and 3 disclose that oxygen poisoning of Rh due to the effects of Ba is promoted and $NO_x$ purification performance decreases in the case Rh and Ba are both present on the same carrier particles. With respect thereto, Patent Documents 2 and 3 report $NO_x$ purification performance is improved by respectively loading Rh and Ba on different carrier particles in a mutually separated state.

PRIOR ART DOCUMENTS

Patent Documents

[Patent Document 1] Japanese Patent No. 3997783
[Patent Document 2] Japanese Unexamined Patent Publication No. 2002-326033
[Patent Document 3] Japanese Unexamined Patent Publication No. H09-215922

DISCLOSURE OF THE INVENTION

Problems to be Solved by the Invention

An object of the present invention is to provide an exhaust gas purification device that is capable of improving $NO_x$ purification performance.

Means for Solving the Problems

The inventors of the present invention found that the aforementioned problems can be solved by the means indicated below.

[1] An exhaust gas purification device having on a substrate a catalyst layer comprising:
an Rh—Ba-loaded catalyst obtained by loading Rh and Ba on a first carrier particle, and
a Pt/Pd—Ba-loaded catalyst obtained by loading Ba and one or more types of precious metals selected from Pt and Pd on a second carrier particle;
wherein, the exhaust gas purification device satisfies at least one of the following conditions (a) to (c):
(a) the degree of Rh—Ba dispersion, as calculated by measuring with an EPMA, in the catalyst layer is greater than 0.001 and less than 1.000;
(b) the loaded amount of Ba based on the weight of the first carrier particle in the Rh—Ba-loaded catalyst is greater than 0.01% by weight and less than 10.00% by weight, and the loaded amount of Ba based on the weight of the second carrier particle in the Pt/Pd—Ba-loaded catalyst is 10.00% by weight to 20.00% by weight; and
(c) the loaded amount of Ba based on the weight of the first carrier particle in the Rh—Ba-loaded catalyst is greater than 0.005 times to less than 0.800 times the loaded amount of Ba based on the weight of the second carrier particle in the Pt/Pd—Ba-loaded catalyst.
[2] The exhaust gas purification device described in [1], which at least satisfies the condition (a).
[3] The exhaust gas purification device described in [1], which at least satisfies the condition (b).
[4] The exhaust gas purification device described in [1], which at least satisfies the condition (c).
[5] The exhaust gas purification device described in any of [1] to [4], wherein at least one of the first carrier particle and the second carrier particle contains alumina.
[6] The exhaust gas purification device described in any of [1] to [5], wherein the catalyst layer further contains a ceria-zirconia composite oxide.
[7] The exhaust gas purification device described in any of [1] to [6], wherein the catalyst layer is composed of two or more layers, at least one of those layers contains the Rh—Ba-loaded catalyst and the Pt/Pd—Ba-loaded catalyst, and the other layers contain the Pt/Pd—Ba-loaded catalyst.
[8] A method for producing the exhaust gas purification device described in any of [1] to [7], comprising:
preparing a slurry having a pH of 4 to 8 that contains:
an Rh—Ba-loaded catalyst obtained by loading Rh and Ba on a first carrier particle,
a Pt/Pd—Ba-loaded catalyst obtained by loading Ba and at least one type of precious metal selected from Pt and Pd on a second carrier particle,
a binder, and
water; and,
impregnating the slurry into a substrate followed by drying and baking to load the slurry components on the substrate.
[9] The method described in [8], wherein barium acetate is used as a Ba salt in the preparation of the Rh—Ba-loaded catalyst and the Pt/Pd—Ba-loaded catalyst.
[10] The method for producing an exhaust gas purification device described in [8] or [9], wherein the binder contains a boehmite sol.

Effects of the Invention

According to the present invention, an exhaust gas purification device can be provided that is capable of improving $NO_x$ purification performance.

BEST MODE FOR CARRYING OUT THE INVENTION

<<Exhaust Gas Purification Device>>

The exhaust gas purification device of the present invention is an exhaust gas purification device that has, on a substrate, a catalyst layer comprising:

an Rh—Ba-loaded catalyst obtained by loading Rh and Ba on a first carrier particle, and a Pt/Pd—Ba-loaded catalyst obtained by loading Ba and one or more types of precious metals selected from Pt and Pd on a second carrier particle, and satisfies at least one of the following conditions (a) to (c):

(a) the degree of Rh—Ba dispersion, as calculated by measuring with an EPMA, in the catalyst layer is greater than 0.001 and less than 1.000;

(b) the loaded amount of Ba based on the weight of the first carrier particle in the Rh—Ba-loaded catalyst is greater than 0.01% by weight and less than 10.00% by weight, and the loaded amount of Ba based on the weight of the second carrier particle in the Pt/Pd—Ba-loaded catalyst is 10.00% by weight to 20.00% by weight; and (c) the loaded amount of Ba based on the weight of the first carrier particle in the Rh—Ba-loaded catalyst is greater than 0.005 times to less than 0.800 times the loaded amount of Ba based on the weight of the second carrier particle in the Pt/Pd—Ba-loaded catalyst.

Figure 1:
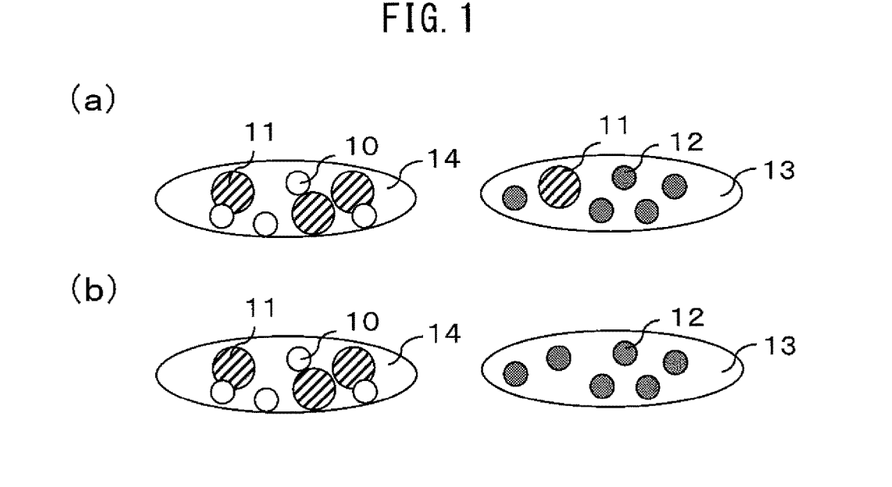
FIG. 1 is a conceptual drawing of the exhaust gas purification device of the present invention.

As shown in FIG. 1(a), for example, the exhaust gas purification device of the present invention is an exhaust gas purification catalyst having a catalyst layer, comprising an Rh—Ba-loaded catalyst, obtained by loading Rh (12) and Ba (11) on a first carrier particle (13), and a Pt/Pd—Ba-loaded catalyst, obtained by loading Ba (11) and one or more types of precious metals (10) selected from Pt and Pd on a second carrier particle (14), on a substrate.

In Patent Documents 2 and 3, $NO_x$ purification performance can be improved in the case of actively separating Rh (12) and Ba (11) as shown in FIG. 1(b). However, the inventors of the present invention presumed that, in the case of completely separating Rh and Ba, the step in which $NO_2$ stored on the Ba (11) migrates to the Rh (12) is the rate-limiting step, thereby conversely causing a decrease in $NO_x$ purification performance as shown in FIG. 2(b).

Figure 2:
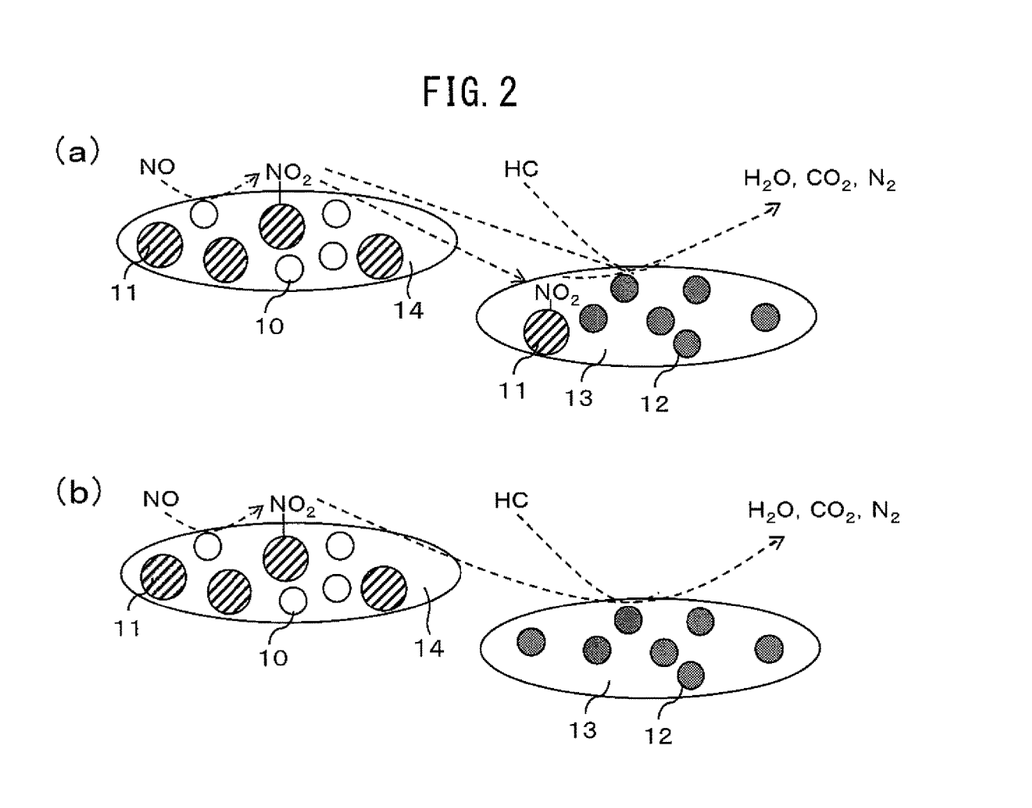
FIG. 2 is a conceptual drawing of the $NO_x$ purification mechanism of the exhaust gas purification device of the present invention.

On the basis of this viewpoint, the inventors of the present invention separated the Rh (12) and Ba (11) to a certain degree without completely separating the two while also actively allowing the Pt or Pd (10) to be present with the Ba (11) as shown in FIG. 2(a). As a result, the Pt or Pd (10) is able to oxidize NO to $NO_2$ and store the $NO_2$ on the Ba (11) in the vicinity thereof. Since $NO_2$ is also stored on Ba in the vicinity of Rh, migration of the stored $NO_2$ to the Rh (12) proceeds smoothly, thereby making it possible to improve $NO_x$ purification performance. The inventors of the present invention completed the exhaust gas purification device of the present invention on the basis of such considerations.

<Catalyst Layer>

The catalyst layer of the exhaust gas purification device contains an Rh—Ba-loaded catalyst, obtained by loading Rh and Ba on a first carrier particle, and a Pt/Pd—Ba-loaded catalyst, obtained by loading Ba and one or more types of precious metals selected from Pt and Pd on a second carrier particle. From the viewpoint of separating the Rh and Ba to a certain degree without completely separating, the degree of Rh—Ba dispersion in this catalyst layer as calculated by measuring with an EPMA may be greater than 0.001, 0.01 or more or 0.05 or more, and less than 1.000, 0.900 or less or 0.600 or less.

In the case the degree of Rh—Ba dispersion is within the aforementioned ranges, since this means that the Rh and Ba are separated to a certain degree, oxygen poisoning of Rh due to the effects of Ba are inhibited and $NO_2$ stored on the Ba smoothly migrates to the Rh. Consequently, $NO_x$ purification performance can be improved, thereby making this preferable.

From the same viewpoint, the loaded amount of Ba based on the weight of the first carrier particle in the Rh—Ba-loaded catalyst may be greater than 0.01% by weight, 0.10% by weight or more or 0.50% by weight or more, and less than 10.00% by weight, 9.30% by weight or less or 6.50% by weight or less. The loaded amount of Ba based on the weight of the second carrier particle in the Pt/Pd—Ba-loaded catalyst may be 10.00% by weight or more, 15.00% by weight or more or 20.00% by weight or more, and 20.00% by weight or less, 25.00% by weight or less or 30.00% by weight or less.

In the case the loaded amount of Ba based on the weight of the first carrier particles in the Rh—Ba-loaded catalyst is within the aforementioned ranges, since the Rh and Ba are separated to a certain degree, oxygen poisoning of Rh due to the effects of Ba is inhibited and $NO_2$ stored on the Ba smoothly migrates to the Rh. Consequently, $NO_x$ purification performance can be improved, thereby making this preferable.

In the case the loaded amount of Ba based on the weight of the second carrier particle in the Pt/Pd—Ba-loaded catalyst is within the aforementioned ranges, Pt or Pd oxidizes NO to $NO_2$ and $NO_2$ can be adequately stored on Ba in the vicinity thereof, thereby making this preferable.

From the same viewpoint, the loaded amount of Ba based on the weight of the first carrier particle in the Rh—Ba-loaded catalyst may be greater than 0.005 times, 0.006 times or more, 0.02 times or more or 0.05 times or more, and less than 0.800 times, 0.770 times or less, 0.700 times or less or 0.500 times or less the loaded amount of Ba based on the weight of the second carrier particle in the Pt/Pd—Ba-loaded catalyst.

In the case of the loaded amount of Ba based on the weight of the first carrier particle in the Rh—Ba-loaded catalyst is within the aforementioned ranges, in addition to separating the Rh and Ba to a certain degree without completely separating, Pt or Pd can actively be made to be present with the Ba, thereby making this preferable. As a result, the Pt or Pd is able to oxidize NO to $NO_2$ and store the $NO_2$ on Ba in the vicinity thereof. Since $NO_2$ is stored on Ba in the vicinity of Rh, the stored $NO_2$ migrates smoothly to the Rh, thereby making it possible to improve $NO_x$ purification performance.

(Degree of Rh—Ba Dispersion)

Figure 3:
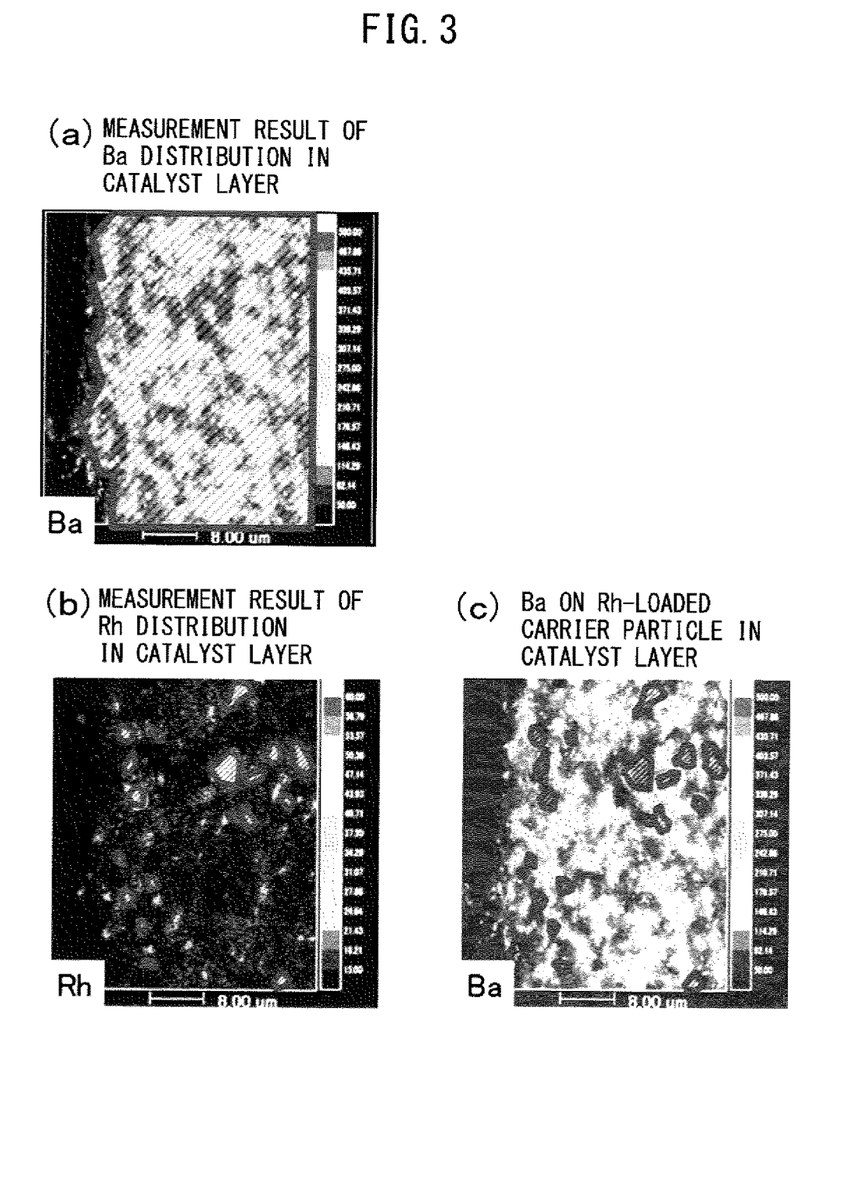
FIG. 3 shows one example of FE-EPMA measurement results.

In the present invention, the degree of Rh—Ba dispersion can be measured using a field emission electron probe microanalyzer (FE-EPMA, Model JXA-8530F, JEOL Ltd.). More specifically, Ba density ($Ba_{ave}$) per unit area of the catalyst layer and Ba density ($Ba_{Rh}$) per unit area for a region in which Rh-loaded particles are present can be calculated by observing using an FE-SPMA, and the degree of Rh—Ba dispersion ($Ba_{Rh}/Ba_{ave}$) can be determined from the resulting values. The aforementioned calculation can be carried out using image processing software provided with the analyzer (JEOL Electron Probe Microanalyzer Ver. 1.7.0.5). As shown in FIG. 3, the aforementioned densities can be easily quantified from hue intensity values and the area within a selected range (within the lines shown in FIG. 3) using image processing software.

More specifically, the degree of Rh—Ba dispersion ($Ba_{Rh}/Ba_{ave}$) can be determined according to the following procedure using an FE-SPMA. As shown in FIG. 3(a), Ba density per unit area ($Ba_{ave}$) is calculated from the results of measuring the Ba distribution in the catalyst layer. As shown in FIG. 3(b), Rh-loaded particles are detected from the results of measuring Rh distribution of the catalyst layer, and as shown in FIG. 3(c), Ba density per unit area ($Ba_{Rh}$) for a region in which Rh-loaded particles are present is calculated from the overlap of the Rh-loaded particles and Ba. The degree of Rh—Ba dispersion ($Ba_{Rh}/Ba_{ave}$) is then determined from the resulting values of $Ba_{ave}$ and $Ba_{Rh}$.

Figure 4:
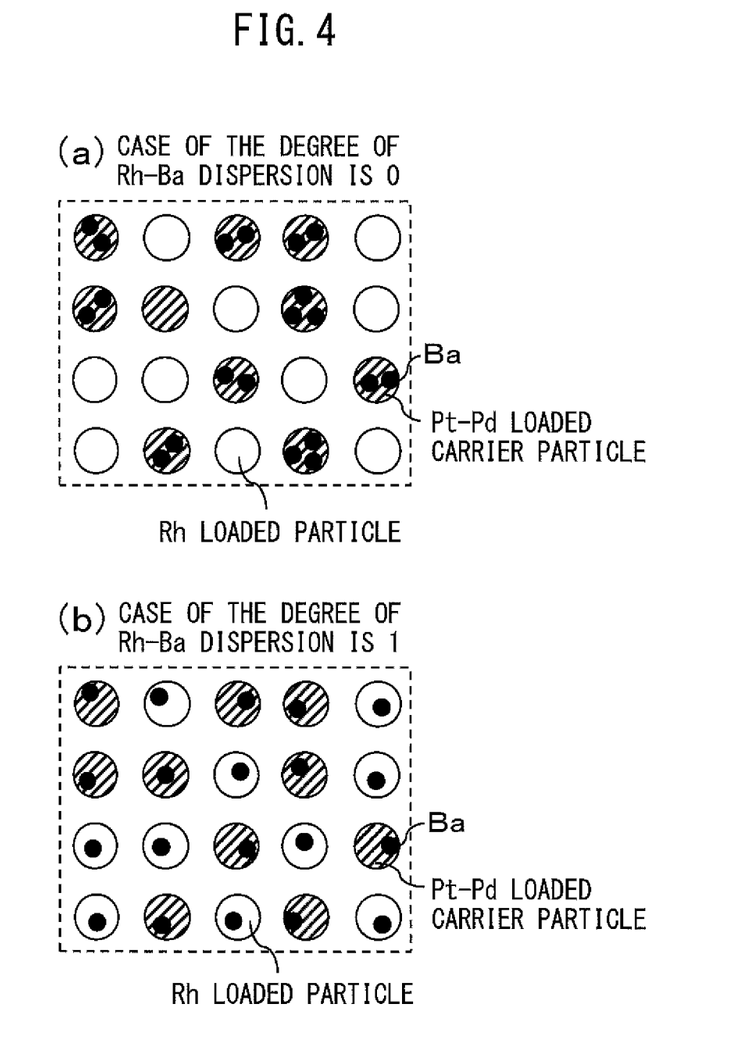
FIG. 4 is an explanatory drawing of degree of Rh—Ba dispersion.

The following provides a more detailed description of the degree of Rh—Ba dispersion ($Ba_{Rh}/Ba_{ave}$) in the present invention. A degree of Rh—Ba dispersion of 0, for example, refers to the case in which Ba is not loaded on the Rh-loaded particles, and indicates a state in which Rh and Ba are completely separated as shown in FIG. 4(a). A degree of Rh—Ba dispersion of 1 refers to the case in which Ba is equally loaded on the Rh-loaded particles and on particles loaded with one or more types of precious metals selected from Pt and Pd, and indicates a state in which Rh and Ba are not separated. Thus, the smaller the degree of Rh—Ba dispersion, the more a state is indicated in which the Rh and Ba are separated and Ba is not loaded on Rh-loaded particles.

(Pt/Pd-Loaded Catalyst)

The catalyst layer of the exhaust gas purification device may also contain a Pt/Pd-loaded catalyst, obtained by loading one or more types of precious metals selected from Pt- and Pd-loaded particles on a third carrier particle, in addition to the Rh—Ba-loaded catalyst and Pt/Pd—Ba-loaded catalyst. This Pt/Pd-loaded catalyst is preferably not loaded with Ba. As a result of the catalyst layer containing this Pt/Pd-loaded catalyst, since this catalyst has Pt or Pd for which activity is not inhibited by Ba, there is no decrease in $NO_x$ purification performance even at low temperatures, thereby making this preferable.

(Loaded Amounts of Precious Metal in each Loaded Catalyst)

The loaded amount of Rh based on the weight of the first carrier particle in the Rh—Ba-loaded catalyst may be greater than 0.01% by weight, 0.10% by weight or more or 0.50% by weight or more, and less than 10.00% by weight, 5.00% by weight or less or 2.00% by weight or less.

The loaded amount of Pt based on the weight of the second carrier particle in the Pt/Pd—Ba-loaded catalyst may be greater than 0.01% by weight, 0.10% by weight or more or 0.50% by weight or more, and less than 10.00% by weight, 5.00% by weight or less or 2.00% by weight or less.

The loaded amount of Pd based on the weight of the second carrier particle in the Pt/Pd—Ba-loaded catalyst may be greater than 0.05% by weight, 0.50% by weight or more or 1.50% by weight or more, and less than 15.00% by weight, 7.50% by weight or less or 5.00% by weight or less.

In the case a Pt/Pd-loaded catalyst is present, the loaded amount of Pt based on the weight of the third carrier particles in this loaded catalyst may be greater than 0.01% by weight, 0.10% by weight or more or 0.50% by weight or more, and less than 10.00% by weight, 5.00% by weight or less or 2.00% by weight or less.

In the case a Pt/Pd-loaded catalyst is present, the loaded amount of Pd based on the weight of the third carrier particles in this loaded catalyst may be greater than 0.05% by weight, 0.50% by weight or more or 1.50% by weight or more, and less than 15.00% by weight, 7.50% by weight or less or 5.00% by weight or less.

(Carrier Particles)

There are no particular limitations on the aforementioned first to third carrier particles provided they are each carrier particles capable of stably loading each of the metal particles of Pt, Pd, Rh and Ba in each of the aforementioned loaded catalysts over a long period of time. Examples of such carrier particles include particles composed of materials such as oxides or non-oxides having a large specific surface area.

Examples of the materials of such carrier particles include alumina, ceria, zirconia, silica, titania, solid solutions thereof (such as ceria-zirconia composite oxide (CZ)) and combinations thereof. These materials may further contain an oxide such as barium oxide, lanthanum oxide or yttrium oxide (such as zirconium-cerium-yttrium oxide (ZCY)). A ceramic material such as alumina or zirconia having high heat resistance is preferably used for the carrier particles from the viewpoint of enhancing thermal stability of the exhaust gas purification device.

In addition to γ-alumina, silica-alumina-based and β-alumina-based porous carrier particles can be used for the alumina-based material. Non-oxides such as silicon nitride, aluminum nitride, silicon carbonate or titanium nitride can also be preferably used as carrier particles due to the stability thereof over a long period of time.

The carrier particles may be such that the first carrier particle loaded with Rh and Ba, the second carrier particle loaded with Ba and one or more types of precious metals selected from Pt and Pd, and the third carrier particle loaded with one or more types of precious metals selected from Pt and Pd may be composed of respectively different compositions or materials or may be composed of substantially identical compositions or materials.

The specific surface area of each of the carrier particles may be, for example, 30 $m^2/g$ or more, 50 $m^2/g$ or more, 100 $m^2/g$ or more or 150 $m^2/g$ or more or 200 $m^2/g$ or more, and 2,000 $m^2/g$ or less, 1,000 $m^2/g$ or less, 800 $m^2/g$ or less, 500 $m^2/g$ or less or 400 $m^2/g$ or less, from the viewpoint of loading ability, heat resistance and structural stability.

(Co-Catalyst)

The catalyst layer may also contain one or more types of co-catalyst components having compositions different from the Rh—Ba-loaded catalyst and Pt/Pd—Ba-loaded catalyst in order to further improve $NO_x$ purification performance. Examples of co-catalyst components include oxygen storing and releasing components (such as ceria or ceria-zirconia composite oxide (CZ)), zirconia and zeolite.

(Usage Ratio of Each Catalyst)

The usage ratios of the Rh—Ba-loaded catalyst and Pt/Pd—Ba-loaded catalyst in the catalyst layer of the exhaust gas purification device as the weight ratio of the Rh—Ba-loaded catalyst to the total weight of both catalysts may be 20% by weight or more, 30% by weight or more or 40% by weight or more, and 80% by weight or less, 70% by weight or less or 60% by weight or less.

In the case the catalyst layer contains a Pt/Pd-loaded catalyst, the usage ratio of this loaded catalyst as the weight ratio of the Pt/Pd-loaded catalyst to the total weight of the Rh—Ba-loaded catalyst, Pt/Pd—Ba-loaded catalyst and Pt/Pd-loaded catalyst may be 5% by weight or more, 10% by weight or more or 20% by weight or more, and 60% by weight or less, 50% by weight or less or 40% by weight or less.

(Layer Composition)

The layer composition of the catalyst layer of the exhaust gas purification device may consist of a single layer or two or more layers. In the case the catalyst layer consists of two or more layers, at least one of the layers contains the Rh—Ba-loaded catalyst and the Pt/Pd—Ba-loaded catalyst, while the other layers contain the Pt/Pd—Ba-loaded catalyst. In the case the layer composition of the catalyst layer consists of two layers, although it is effective for the upper layer to contain the Pt/Pd—Ba-loaded catalyst and the lower layer to contain the Rh—Ba-loaded catalyst and the Pt/Pd—Ba-loaded catalyst, the upper layer may contain the Rh—Ba-loaded catalyst and the Pt/Pd—Ba-loaded catalyst and the lower layer may contain the Pt/Pd—Ba-loaded catalyst provided the object of the present invention is not impaired.

In the case the catalyst layer of the exhaust gas purification device is composed of two or more layers, the present invention is able to demonstrate the desired effects thereof provided at least one of the layers satisfies the prescribed requirements of the present invention. Other layers may or may not satisfy the prescribed requirements of the present invention.

(Coated Amount of Catalyst Layer)

The coated amount of the catalyst layer in the exhaust gas purification device may be 100 g/L to 300 g/L as the weight of the catalyst layer per liter of substrate volume.

(Amount of Precious Metal Contained in Catalyst Layer)

The amount of precious metal contained in the catalyst layer in the exhaust gas purification device may be 0.5 g/L to 5 g/L as the total weight of precious metal per liter of substrate volume.

<Substrate>

There are no particular limitations on the substrate, and an arbitrary material typically used in exhaust gas purification devices can be used. More specifically, a honeycomb-shaped material having a large number of cells can be used for the substrate, and examples of such materials that can be used include heat-resistant ceramic materials such as cordierite ($2MgO.2Al_2O_3.5SiO_2$), alumina, zirconia or silicon carbide; and metal materials composed of a metal foil such as stainless steel foil.

<<Exhaust Gas Purification Device Production Method>>

The following provides a description of a method for producing the exhaust gas purification device of the present invention. The present invention can be better understood by mutually referring to embodiments of the exhaust gas purification device of the present invention and method for producing the exhaust gas purification device of the present invention.

The method for producing the exhaust gas purification device of the present invention comprises:

preparing a slurry having a pH of 4 to 8 that contains:

an Rh—Ba-loaded catalyst obtained by loading Rh and Ba on a first carrier particle, a Pt/Pd—Ba-loaded catalyst obtained by loading Ba and at least one type of precious metal selected from Pt and Pd on a second carrier particle, a binder, and water; and, impregnating the slurry into a substrate followed by drying and baking to load the slurry components on the substrate.

(Rh—Ba-Loaded Catalyst Preparation Method)

The Rh—Ba-loaded catalyst can be obtained according to, for example, the steps indicated below. The first carrier particles are dispersed in water to prepare a Dispersion 1. An aqueous solution containing an Rh salt is further added to this Dispersion 1 followed by adequately mixing and drying to obtain Rh-loaded particles having Rh loaded on the first carrier particles. These Rh-loaded particles are then again dispersed in water to prepare a Dispersion 2. An aqueous solution containing a Ba salt is further added to this Dispersion 2 followed by adequately mixing and drying and then baking to obtain an Rh—Ba-loaded catalyst having Rh and Ba loaded on the first carrier particles. Examples of the Rh salt used here include water-soluble salts such as rhodium nitrate, rhodium chloride or rhodium hydroxide.

(Pt/Pd—Ba-Loaded Catalyst Preparation Method)

The Pt/Pd—Ba-loaded catalyst can be obtained according to, for example, the steps indicated below. The second carrier particles are dispersed in water to prepare a Dispersion 3. An aqueous solution containing a salt of a precious metal selected from Pt and Pd is further added to this Dispersion 3 followed by adequately mixing and drying to obtain Pt/Pd-loaded particles having Pt and/or Pd loaded on the second carrier particles. These Pt/Pd-loaded particles are then again dispersed in water to prepare a Dispersion 4. An aqueous solution containing a Ba salt is further added to this Dispersion 4 followed by adequately mixing and drying and then baking to obtain the Pt/Pd—Ba-loaded catalyst having Ba and one or more types of precious metals selected from Pt and Pd on the second carrier particles. Examples of the precious metal salt used here include water-soluble salts such as platinum nitrate, platinum chloride, palladium nitrate and palladium chloride.

The drying temperature in the aforementioned Rh—Ba-loaded catalyst and Pt/Pd—Ba-loaded catalyst preparation methods may be, for example, 70° C. or higher, 80° C. or higher or 90° C. or higher, and 150° C. or lower, 120° C. or lower, 110° C. or lower or 100° C. or lower.

The baking temperature in the aforementioned Rh—Ba-loaded catalyst and Pt/Pd—Ba-loaded catalyst preparation methods may be, for example, 300° C. or higher, 400° C. or higher or 500° C. or higher, and 1,500° C. or lower, 1,300° C. or lower or 1,100° C. or lower. Baking time may be 1 hour or more, 2 hours or more or 4 hours or more, and 10 hours or less or 8 hours or less.

Examples of Ba salts that can be used in the preparation of the Rh—Ba-loaded catalyst and Pt/Pd—Ba-loaded catalyst include water-soluble salts such as barium acetate, barium chloride, barium nitrate or barium hydroxide. Among these, barium acetate and barium chloride are used particularly preferably due to their superior solubility in water. Poorly soluble salts such as barium sulfate or barium carbonate are unable to be loaded onto the carrier particles, thereby making them undesirable.

In the present invention, by preparing the Rh—Ba-loaded catalyst and Pt/Pd—Ba-loaded catalyst separately, in addition to being able to realize a certain degree of separation between the Rh and Ba, Pt or Pd can be actively made to be present together with the Ba.

(Slurry Preparation)

The method for producing the exhaust gas purification device of the present invention comprises a step for preparing a slurry having a pH of 4 to 8 that contains an Rh—Ba-loaded catalyst, a Pt/Pd—Ba-loaded catalyst, a binder and water.

The binder fulfills the role of improving durability of the exhaust gas purification device by binding carrier particles to each other and binding the carrier particles to precious metal. Examples of binders that can be used include boehmite sol, titanic sol, silica sol and combinations thereof.

The pH of the slurry may be 4 or higher, 5 or higher 6 or higher or 7 or higher, and 8 or lower, 7 or lower, 6 or lower or 5 or lower. In the case the pH is within the aforementioned ranges, in addition to being able to prevent catalyst components from being eluted from the Rh—Ba-loaded catalyst and Pt/Pd—Ba-loaded catalyst contained in the slurry, the slurry can be inhibited from aggregating. As a result thereof, the exhaust gas purification device of the present invention can be suitably produced, thereby making this preferable.

An acid or base can be incorporated in the slurry as necessary in order to adjust pH. The acid may be an inorganic acid or organic acid. Examples of inorganic acids that can be used include hydrochloric acid, sulfuric acid and nitric acid. The base may be an inorganic base or organic base. Examples of inorganic bases include sodium hydroxide, calcium hydroxide and potassium hydroxide.

The slurry may further contain a Pt/Pd-loaded catalyst or co-catalyst arbitrarily contained in the catalyst layer of the exhaust gas purification device.

The slurry can also further contain a surfactant or dispersion resin for adjusting viscosity and improving slurry dispersibility.

The method for producing the exhaust gas purification device of the present invention comprises a step for loading slurry components on a substrate by impregnating the slurry into the substrate followed by drying and baking. The drying temperature, baking temperature and baking time can be the same as those of the conditions used in preparing the Rh—Ba-loaded catalyst and Pt/Pd—Ba-loaded catalyst.

The following provides a detailed explanation of the present invention through examples and comparative examples. The technical scope of the present invention is not limited to the following examples and comparative examples.

<<Preparation of Exhaust Gas Purification Device>>

Example 1

(Preparation of Pt—Ba-Loaded Alumina)

Alumina was dispersed in water followed by adding an aqueous platinum nitrate solution so that the loaded amount of Pt with respect to the alumina was 1.0% by weight. The resulting mixture was then dried to obtain a Pt-loaded alumina powder. The resulting Pt-loaded alumina powder was dispersed in water followed by adding barium acetate so that the loaded amount of Ba with respect to the alumina was 13.4% by weight. The resulting mixture was then dried to prepare a Pt—Ba-loaded alumina powder. The resulting Pt—Ba-loaded alumina powder was then baked at 400° C. to 600° C. to obtain Pt—Ba-loaded alumina. The loaded Ba was confirmed by XRD to be present in the form of barium carbonate.

(Preparation of Pd-Loaded Alumina)

Alumina was dispersed in water followed by adding an aqueous palladium nitrate solution so that the loaded amount of Pd with respect to the alumina was 3.0% by weight. The resulting mixture was then dried to obtain Pd-loaded alumina.

(Preparation of Rh—Ba-Loaded Alumina)

Alumina was dispersed in water followed by adding an aqueous rhodium nitrate solution so that the loaded amount of Rh with respect to the alumina was 1.0% by weight. The resulting mixture was then dried to obtain an Rh-loaded alumina powder. The resulting Rh-loaded alumina powder was dispersed in water followed by adding barium acetate so that the loaded amount of Ba with respect to the alumina was 0.1% by weight. The resulting mixture was then dried to prepare a Rh—Ba-loaded alumina powder. The resulting Rh—Ba-loaded alumina powder was then baked at 400° C. to 600° C. to obtain Rh—Ba-loaded alumina. The loaded Ba was confirmed by XRD to be present in the form of barium carbonate.

(Preparation of Exhaust Gas Purification Device)

The Pt—Ba-loaded alumina, Pd-loaded alumina and Rh—Ba-loaded alumina (weight ratio: 1:1:1) prepared in the manner described above along with ceria-zirconia composite oxide (CZ material) and boehmite sol were mixed in water followed by wet-crushing to prepare a slurry. The pH of the slurry was 5. The resulting slurry was coated onto a honeycomb substrate made of cordierite so that the coated amount per liter of substrate volume after baking was 290 g followed by drying and baking to obtain the exhaust gas purification device of Example 1.

Examples 2 to 5 and Comparative Examples 1 to 4

Exhaust gas purification devices of Examples 2 to 5 and Comparative Examples 1 to 4 were obtained using the same method as Example 1 with the exception of changing the loaded amount of Ba with respect to alumina in preparing the Pt—Ba-loaded catalyst of Example 1, and changing the loaded amount of Ba with respect to alumina in preparing the Rh—Ba-loaded catalyst of Example 1, to the amounts shown in the following Table 1.

Example 6

(Preparation of Pt—Ba-Loaded Alumina 1)

Pt—Ba-Loaded Alumina 1 was obtained using the same method as that used to prepare the Pt—Ba-loaded alumina of Example 1 with the exception adding aqueous platinum nitrate solution so that the loaded amount of Pt with respect to alumina was 0.5% by weight and adding barium acetate so that the loaded amount of Ba with respect to alumina was 13.0% by weight in preparing the Pt—Ba-loaded alumina of Example 1.

(Preparation of Pd-Loaded Alumina)

Pd-loaded alumina was obtained using the same method as the method used to prepare the Pd-loaded alumina of Example 1.

(Preparation of Rh—Ba-Loaded Alumina)

Rh—Ba-loaded alumina was obtained using the same method as the method used to prepare the Rh—Ba-loaded alumina of Example 1 with the exception of adding barium acetate so that the loaded amount of Ba with respect to alumina was 6.0% by weight in preparing the Rh—Ba-loaded alumina of Example 1.

(Preparation of Slurry 1)

The Pt—Ba-Loaded Alumina 1, Pd-loaded alumina and Rh—Ba-loaded alumina (weight ratio: 1:1:1) prepared in the manner described above along with ceria-zirconia composite oxide (CZ material) and boehmite sol were mixed in water followed by wet-crushing to prepare a Slurry 1. The pH of the slurry was 5.

(Preparation of Pt—Ba-Loaded Alumina 2)

Pt—Ba-Loaded Alumina 2 was obtained using the same method as that used to prepare the Pt—Ba-loaded alumina of Example 1 with the exception of adding aqueous platinum nitrate solution so that the loaded amount of Pt with respect to alumina was 2.0% by weight and adding barium acetate so that the loaded amount of Ba with respect to alumina was 8.5% by weight in preparing the Pt—Ba-loaded alumina of Example 1.

(Preparation of Slurry 2)

The Pt—Ba-Loaded Alumina 2 prepared in the manner described above, ceria-zirconia composite oxide (CZ material) and boehmite sol were mixed in water followed by wet-crushing to prepare a Slurry 2. The pH of the slurry was 5.

(Preparation of Exhaust Gas Purification Device)

The resulting Slurry 1 was coated onto a honeycomb substrate made of cordierite followed by drying and then baking to form a lower layer. The resulting Slurry 2 was then coated onto the substrate having the lower layer formed thereon followed by drying and then baking to form an upper layer to obtain the exhaust gas purification device of Example 6 in which the total coated amount for the upper and lower layers per liter of substrate volume after baking was 290 g.

Example 7 and Comparative Example 5

The exhaust gas purification devices of Example 7 and Comparative Example 5 were obtained using the same method as Example 6 with the exception of changing the loaded amount of Ba with respect to alumina in preparing the Pt—Ba-loaded catalyst of Example 6, and changing the loaded amount of Ba with respect to alumina in preparing the Rh—Ba-loaded catalyst of Example 6, to the amounts shown in the following Table 1.

Comparative Example 6

The exhaust gas purification device of Comparative Example 6 was obtained using the same method as Example 1 with the exception of using aluminum nitrate instead of boehmite sol and the pH of the resulting slurry being 3 in preparing the exhaust gas purification device of Example 1.

Comparative Example 7

The exhaust gas purification device of Comparative Example 7 was obtained using the same method as Example 1 with the exception of adding barium sulfate so that the loaded amount of Ba with respect to alumina was 13.0% in preparing the Pt—Ba-loaded catalyst of Example 1, and adding barium sulfate so that the loaded amount of Ba with respect to alumina was 3.3% by weight in preparing the Rh—Ba-loaded alumina of Example 1. The Ba in the Pt—Ba-loaded alumina and Rh—Ba-loaded alumina was confirmed by XRD to be present in the form of barium sulfate.

Comparative Example 8

(Preparation of Pt-Loaded Alumina Powder)

Alumina was dispersed in water followed by adding an aqueous platinum nitrate solution so that the loaded amount of Pt with respect to alumina was 1.0% by weight. The resulting mixture was then dried to obtain a Pt-loaded alumina powder.

(Preparation of Pd-Loaded Alumina Powder)

Alumina was dispersed in water followed by adding an aqueous palladium nitrate solution so that the loaded amount of Pd with respect to alumina was 3.0% by weight. The resulting mixture was then dried to obtain a Pd-loaded alumina powder.

(Preparation of Rh-Loaded Alumina Powder)

Alumina was dispersed in water followed by adding an aqueous rhodium nitrate solution so that the loaded amount of Rh with respect to alumina was 1.0% by weight. The resulting mixture was then dried to obtain an Rh-loaded alumina powder.

(Preparation of Exhaust Gas Purification Device)

The Pt-loaded alumina powder, Pd-loaded alumina powder and Rh-loaded alumina powder prepared in the manner described above were mixed in water at a weight ratio of 1:1:1 followed by adding barium acetate so that the loaded amount of Ba in each powder with respect to alumina was 10.0% by weight. Ceria-zirconia composite oxide (CZ material) and boehmite sol were then mixed in followed by wet-crushing to prepare a slurry. The resulting slurry was coated onto a honeycomb substrate made of cordierite so that the coated amount per liter of substrate volume after baking was 290 g followed by drying and baking to obtain the exhaust gas purification device of Comparative Example 8.

<<Measurement of Degree of Rh—Ba Dispersion>>

Values for degree of Rh—Ba dispersion of the catalyst layer in each of the exhaust gas purification devices of Examples 1 to 7 and Comparative Examples 1 to 8 were calculated from the results of FE-EPMA measurement. The Model JXA-8530F manufactured by JEOL Ltd. was used for the measuring instrument. Ba density ($Ba_{ave}$) per unit area of the catalyst layer and Ba density ($Ba_{Rh}$) per unit area for a region in which Rh-loaded particles are present were calculated when observing using an FE-EPMA followed by determination of degree of Rh—Ba dispersion ($Ba_{Rh}/Ba_{ave}$). The aforementioned calculation was carried out using image processing software provided with the analyzer (JEOL Electron Probe Microanalyzer Ver. 1.7.0.5). As shown in FIG. 3, these densities can be easily quantified from hue intensity values and the area within a selected range (within the lines shown in FIG. 3) using image processing software. The evaluation results are shown in Table 1.

<<$NO_x$ Purification Performance Evaluation Test>>

1.5 liter exhaust gas purification devices of each of the Examples 1 to 7 and Comparative Examples 1 to 8 were installed in the exhaust system of a 2 L gasoline engine followed by carrying out a durability test in which catalyst bed temperature is maintained for 50 hours at 750° C. under conditions of repeating stoichiometric, rich and lean burning in that order. Each of the purification devices were respectively installed in the exhaust system of a similar 2 L gasoline engine following completion of durability testing, and $NO_x$ purification rate was measured during mutually repeated cycling between a rich-burning atmosphere and lean-burning atmosphere. The measurement results are shown in Table 1.

TABLE 1

| | | | Slurry Composition | | | | |
| --- | --- | --- | --- | --- | --- | --- | --- |
| | | | Pt-Ba/Al$_2$O$_3$ | | Pd/Al$_2$O$_3$ | | Rh—Ba/Al$_2$O$_3$ |
| | Layer Composition | Ba Salt | Pt loaded amt. (wt %) | Ba loaded amt. (wt %) [A] | Pd loaded amt. (wt %) | Ba loaded amt. (wt %) | Rh loaded amt. (wt %) |
| Ex. 1 | Single layer | Ba acetate | 1.0 | 13.4 | 3.0 | — | 1.0 |
| Ex. 2 | Single layer | Ba acetate | 1.0 | 13.3 | 3.0 | — | 1.0 |
| Ex. 3 | Single layer | Ba acetate | 1.0 | 13.0 | 3.0 | — | 1.0 |
| Ex. 4 | Single layer | Ba acetate | 1.0 | 12.6 | 3.0 | — | 1.0 |
| Ex. 5 | Single layer | Ba acetate | 1.0 | 12.2 | 3.0 | — | 1.0 |
| Comp. Ex. 1 | Single layer | Ba acetate | 1.0 | 13.4 | 3.0 | — | 1.0 |
| Comp. Ex. 1 | Single layer | Ba acetate | 1.0 | 12.1 | 3.0 | — | 1.0 |
| Comp. Ex. 1 | Single layer | Ba acetate | 1.0 | 11.4 | 3.0 | — | 1.0 |
| Comp. Ex. 4 | Single layer | Ba acetate | 1.0 | 10.7 | 3.0 | — | 1.0 |
| Ex. 6 | 2 layers Lower | Ba acetate | 0.5 | 13.0 | 3.0 | — | 1.0 |
| | Upper | Ba acetate | 2.0 | 8.5 | — | — | — |
| Ex. 7 | 2 layers Lower | Ba acetate | 0.5 | 13.8 | 3.0 | — | 1.0 |
| | Upper | Ba acetate | 2.0 | 8.5 | — | — | — |
| Comp. Ex. 5 | 2 layers Lower | Ba acetate | 0.5 | 12.1 | 3.0 | — | 1.0 |
| | Upper | Ba acetate | 2.0 | 8.5 | — | — | — |
| Comp. Ex. 6 | Single layer | Ba acetate | 1.0 | 13.4 (elution) | 3.0 | — | 1.0 |
| Comp. Ex. 7 | Single layer | Ba sulfate | 1.0 | 13.0 (physical mixing) | 3.0 | — | 1.0 |
| Comp. Ex. 8* | Single layer | Ba acetate | 1.0 | 10.0 | 3.0 | 10.0 | 1.0 |

| | Slurry Composition | | | | | | |
| --- | --- | --- | --- | --- | --- | --- | --- |
| | Rh—Ba/Al$_2$O$_3$ Ba loaded amt. (wt %) [B] | [B]/[A] | Co-catalyst | Binder | Slurry pH | Ba$_{Rh}$/Ba$_{ave}$ | NO$_x$ Purification Rate (%) |
| Ex. 1 | 0.1 | 0.007 | CZ | Boehmite sol | 5 | 0.01 | 78 |
| Ex. 2 | 0.6 | 0.045 | CZ | Boehmite sol | 5 | 0.05 | 81 |
| Ex. 3 | 3.3 | 0.254 | CZ | Boehmite sol | 5 | 0.30 | 82 |
| Ex. 4 | 6.4 | 0.508 | CZ | Boehmite sol | 5 | 0.60 | 81 |
| Ex. 5 | 9.3 | 0.762 | CZ | Boehmite sol | 5 | 0.90 | 79 |
| Comp. Ex. 1 | 0.0 | 0.000 | CZ | Boehmite sol | 5 | 0.00 | 75 |
| Comp. Ex. 1 | 10.0 | 0.826 | CZ | Boehmite sol | 5 | 1.00 | 77 |
| Comp. Ex. 1 | 15.0 | 1.316 | CZ | Boehmite sol | 5 | 1.50 | 71 |
| Comp. Ex. 4 | 18.0 | 1.682 | CZ | Boehmite sol | 5 | 2.00 | 61 |
| Ex. 6 | 6.0 | 0.462 | CZ | Boehmite sol | 5 | 0.60 | 90 |
| | — | — | CZ | Boehmite sol | 5 | — | |
| Ex. 7 | 2.0 | 0.145 | CZ | Boehmite sol | 5 | 0.20 | 91 |
| | — | — | CZ | Boehmite sol | 5 | — | |
| Comp. Ex. 5 | 10.0 | 0.826 | CZ | Boehmite sol | 5 | 1.00 | 82 |
| | — | — | CZ | Boehmite sol | 5 | — | |
| Comp. Ex. 6 | 0.1 (elution) | 0.007 | CZ | Aluminum nitrate | 3 | 1.00 | 72 |
| Comp. Ex. 7 | 3.3 (physical mixing) | 0.254 | CZ | Boehmite sol | 5 | — | 0 |
| Comp. Ex. 8* | 10.0 | 1.000 | CZ | Boehmite sol | — | 1.00 | 75 |

Figure 5:
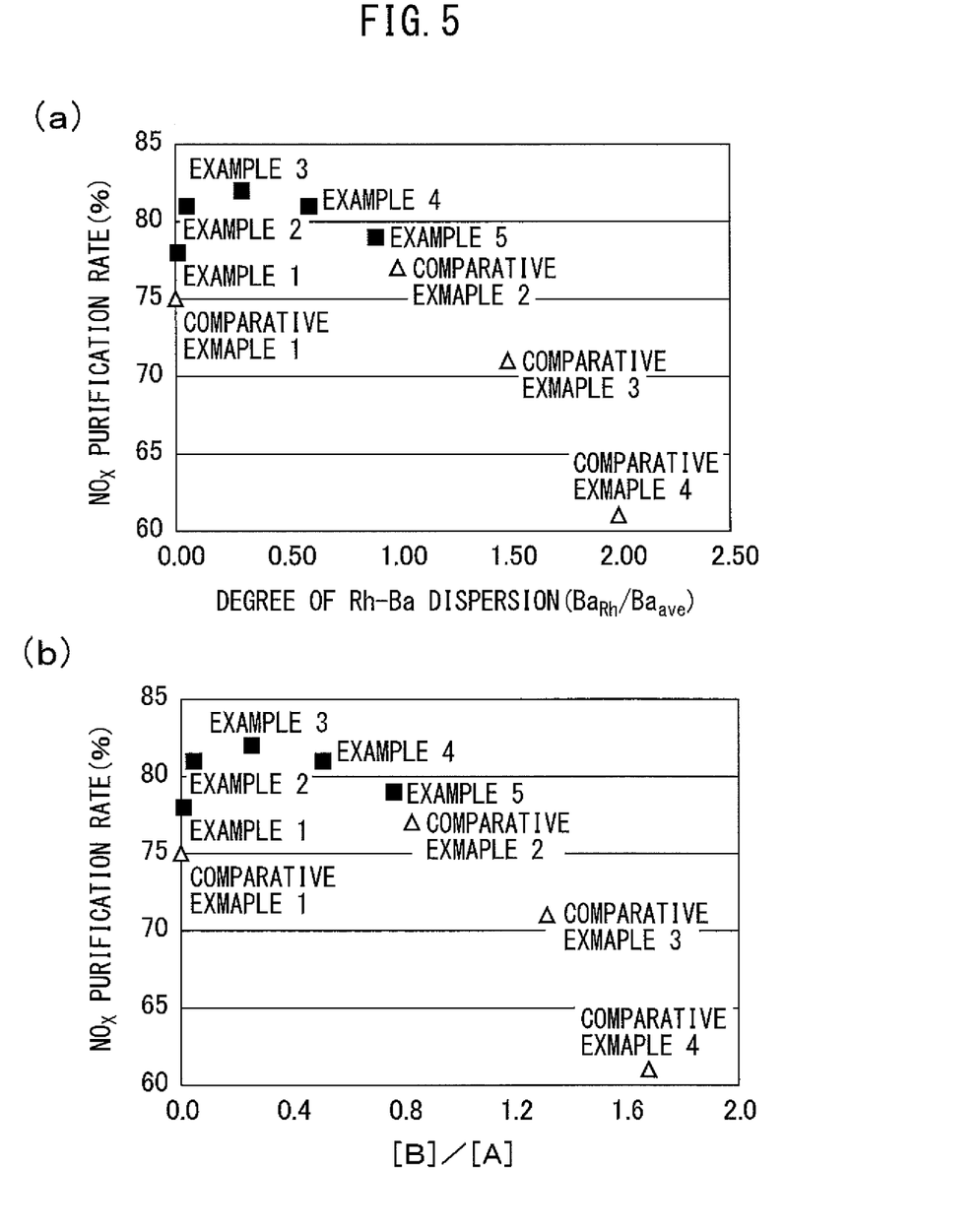
FIG. 5 depicts graphs showing the results for NOx purification rate in the case of a single catalyst layer.

The results for Examples 1 to 5 and Comparative Examples 1 to 4 are summarized in FIG. 5. It was determined from Table 1 and FIG. 5(a) that NO$_x$ purification rate decreases in the case the degree of Rh—Ba dispersion calculated from the results of EPMA measurement is excessively high or excessively low.

It was determined from Table 1 that NO$_x$ purification rate decreases in the case the loaded amount of Ba of Rh—Ba-loaded alumina is excessively large and in the case the loaded amount of Ba of Pt—Ba-loaded alumina is excessively small.

It was determined from Table 1 and FIG. 5(b) that NO$_x$ purification rate decreases in the case the loaded amount of Ba based on the weight of the first carrier particles in the Rh—Ba-loaded catalyst is excessively large or excessively small relative to the loaded amount of Ba based on the weight of the second carrier particles in the Pt—Ba-loaded catalyst.

Figure 6:
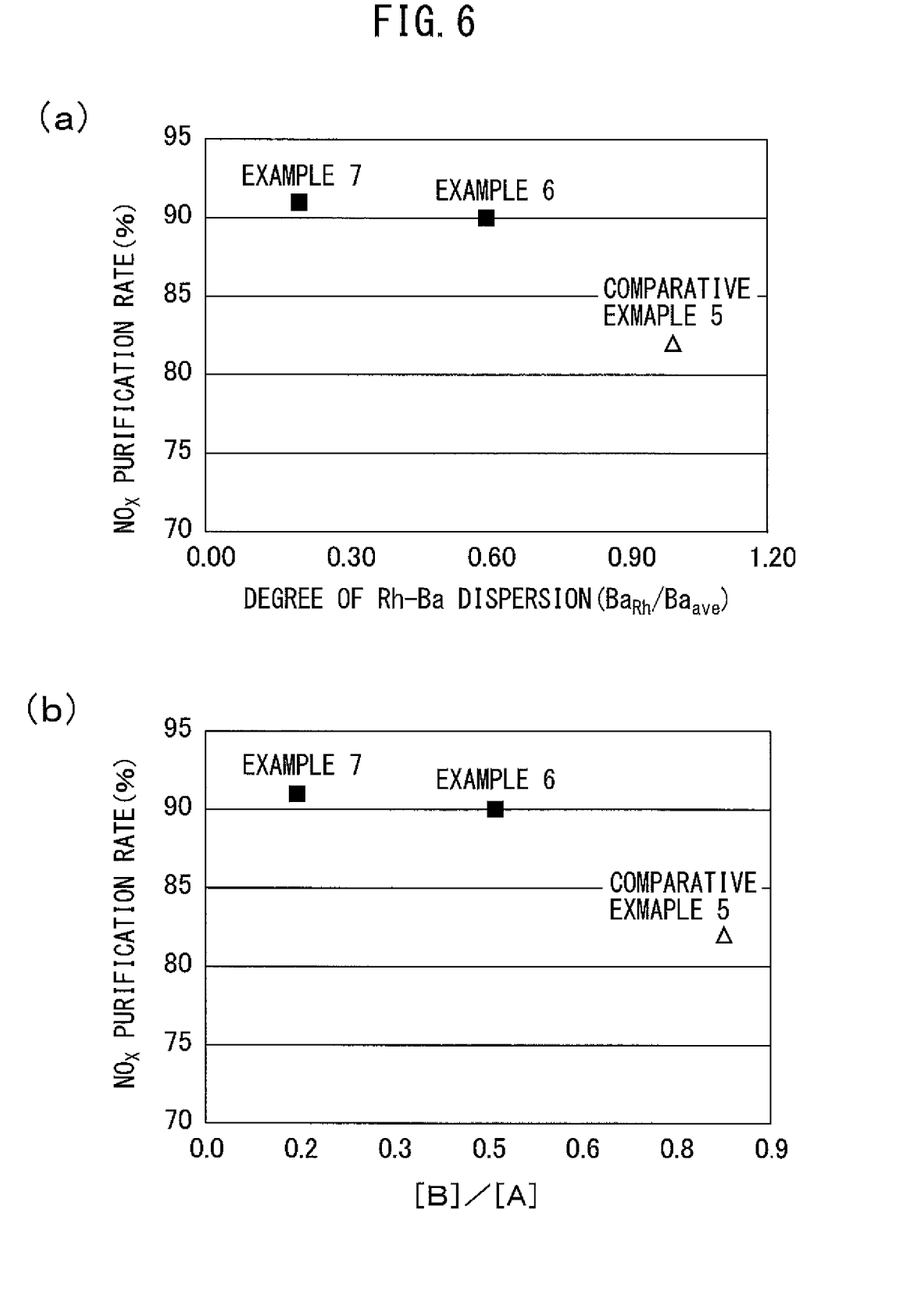
FIG. 6 depicts graphs showing the results for NOx purification rate in the case of two catalyst layers.

The results for Examples 6 and 7 and Comparative Example 5 are summarized in FIG. 6. It was determined from Table 1 and FIGS. 6(a) and 6(b) that even in the case the layer composition of the catalyst layer consists of two layers, effects are obtained that are similar to those in the case of a single layer.

As can be understood from Table 1, the NO$_x$ purification rate in Comparative Example 6 is low in comparison with that of Examples 1 to 5. This is thought to be due to Ba eluting from the Rh—Ba-loaded catalyst and Pt—Ba-loaded catalyst contained in the slurry and then being re-dispersed due to the low pH of the slurry in Comparative Example 6. Re-dispersion of Ba is also suggested from the value of 1 for the degree of Ba—Rh dispersion in Comparative Example 6.

As can be understood from Table 1, the NO$_x$ purification rate in Comparative Example 7 is remarkably low in comparison with that of Examples 1 to 5. This is thought to be due to, in contrast to barium acetate having been used for the Ba salt in Examples 1 to 5, poorly soluble barium sulfate is used for the Ba salt in Comparative Example 7. Consequently, Ba is thought to have been physically mixed into the slurry without being loaded onto the alumina in Comparative Example 7. As a result, the NO$_x$ purification rate in Comparative Example 7 is thought to be extremely low as a result of being unable to obtain the effect of addition of Ba.

As can be understood from Table 1, the NO$_x$ purification rate in Comparative Example 8 is low in comparison with that of Examples 1 to 5. In contrast to Pt—Ba-loaded alumina, Pd-loaded alumina and Rh—Ba-loaded alumina having been prepared separately in Examples 1 to 5, Comparative Example 8 differs therefrom in that, after having prepared Pt-loaded alumina, Pd-loaded alumina and Rh-loaded alumina, a Ba salt was added to a mixture thereof to load Ba onto the entire mixture. Consequently, since Rh and Ba were unable to be separated to a prescribed degree in Comparative Example 8, the degree of dispersion of Rh and Ba was high, and this is thought to have resulted in a decrease in NO$_x$ purification rate.

BRIEF DESCRIPTION OF THE REFERENCE SYMBOLS

10 Pt or Pd
11 Ba
12 Rh
13 First carrier particle
14 Second carrier particle

The invention claimed is:

1. An exhaust gas purification device having on a substrate a catalyst layer comprising:
   an Rh—Ba-loaded catalyst obtained by loading Rh and Ba on a first carrier particle, and
   a Pt/Pd—Ba-loaded catalyst obtained by loading Ba and one or more types of precious metals selected from Pt and Pd on a second carrier particle;
   wherein the exhaust gas purification device satisfies the following condition (a):
   (a) the degree of Rh—Ba dispersion, as calculated by measuring with an EPMA, in the catalyst layer is greater than 0.001 and less than 1.000.

2. The exhaust gas purification device according to claim 1, which further satisfies the following condition (b):
   (b) the loaded amount of Ba based on the weight of the first carrier particle in the Rh—Ba-loaded catalyst is greater than 0.01% by weight and less than 10.00% by weight, and the loaded amount of Ba based on the weight of the second carrier particle in the Pt/Pd—Ba-loaded catalyst is 10.00% by weight to 20.00% by weight.

3. The exhaust gas purification device according to claim 1, which further satisfies the condition (c):
   (c) the loaded amount of Ba based on the weight of the first carrier particle in the Rh—Ba-loaded catalyst is greater than 0.005 times to less than 0.800 times the loaded amount of Ba based on the weight of the second carrier particle in the Pt/Pd—Ba-loaded catalyst.

4. The exhaust gas purification device according to claim 1, wherein at least one of the first carrier particle and the second carrier particle contains alumina.

5. The exhaust gas purification device according to claim 1, wherein the catalyst layer further contains a ceria-zirconia composite oxide.

6. The exhaust gas purification device according to claim 1, wherein the catalyst layer is composed of two or more layers, at least one of those layers contains the Rh—Ba-loaded catalyst and the Pt/Pd—Ba-loaded catalyst, and the other layers contain the Pt/Pd—Ba-loaded catalyst.

7. A method for producing the exhaust gas purification device according to claim 1, comprising:
   preparing a slurry having a pH of 4 to 8 that contains:
   an Rh—Ba-loaded catalyst obtained by loading Rh and Ba on a first carrier particle,
   a Pt/Pd—Ba-loaded catalyst obtained by loading Ba and at least one type of precious metal selected from Pt and Pd on a second carrier particle,
   a binder, and
   water; and,
   impregnating the slurry into a substrate followed by drying and baking to load the slurry components on the substrate.

8. The method according to claim 7, wherein barium acetate is used as a Ba salt in the preparation of the Rh—Ba-loaded catalyst and the Pt/Pd—Ba-loaded catalyst.

9. The method according to claim 7, wherein the binder contains a boehmite sol.

* * * * *